United States Patent [19]

Astegger et al.

[11] Patent Number: 5,178,764
[45] Date of Patent: Jan. 12, 1993

[54] PROCESS FOR CLEANING OR PURIFYING AQUEOUS N-METHYLMORPHOLINE-N-OXIDE SOLUTIONS

[75] Inventors: Stefan Astegger; Heinrich Firgo; Bernd Wolschner, all of Vöcklabruck; Johann Männer, Weyregg/Attersee; Karin Weinzierl, Timelkam; Stefan Zikeli, Regau; Dieter Eichinger, Vöcklabruck, all of Austria

[73] Assignee: Lenzing Aktiengesellschaft, Lenzing, Austria

[21] Appl. No.: 797,126

[22] Filed: Nov. 22, 1991

[30] Foreign Application Priority Data

Nov. 26, 1990 [AT] Austria ................................ 2401/90

[51] Int. Cl.$^5$ ................................................ B01D 15/00
[52] U.S. Cl. ..................................... 210/651; 210/663; 210/688; 210/777
[58] Field of Search ............... 210/663, 681, 688, 777, 210/778, 189, 650, 651

[56] References Cited

U.S. PATENT DOCUMENTS

| | | | |
|---|---|---|---|
| 2,697,724 | 12/1954 | Collier | 210/189 |
| 4,851,128 | 7/1989 | Rose | 210/669 |
| 5,053,138 | 10/1991 | Korger et al. | 210/681 |

FOREIGN PATENT DOCUMENTS

0427701  5/1991  European Pat. Off.
2227231  11/1974  France.

*Primary Examiner*—Ivars Cintins
*Attorney, Agent, or Firm*—Herbert Dubno; Jonathan Myers

[57] ABSTRACT

An aqueous N-methylmorpholine-N-oxide solution which was used as a spinning bath in the production of cellulosic products is regenerated by contacting it with active coal, silicon dioxide or alumina adsorbent and filtering, thereby reducing turbidity, eliminating nitrosoamine, decolorizing the solution and removing transition metals like iron therefrom.

12 Claims, No Drawings

PROCESS FOR CLEANING OR PURIFYING AQUEOUS N-METHYLMORPHOLINE-N-OXIDE SOLUTIONS

FIELD OF THE INVENTION

Our present invention relates to a process for the cleaning or purification of an aqueous N-methylmorpholine-N-oxide (NMMO) solution, especially a spinning bath solution resulting from the production of cellulosic products.

BACKGROUND OF THE INVENTION

It is known to introduce cellulose into an aqueous NMMO solution and to precipitate cellulosic products from that solution by a spinning process or the like. The cellulose is introduced into the aqueous NMMO solution and the solution thus forms a homogeneous cellulose solution. The films or shaped-cellulose objects are formed by precipitation of the cellulose from the solution in water. The cellulosic products are those which have generally been made heretofore by the viscose filament process.

Spinnable solutions of cellulose in aqueous NMMO have a substantial advantage over viscose in that the NMMO for the spinning bath can be recovered and thus does not constitute an environmental contaminant; furthermore, the process is characterized by lack of sulfur-containing emissions.

To regenerate the NMMO contained in a depleted spinning bath or to reuse the NMMO for the production spinnable cellulose solutions, the spinning bath solution must be cleaned and concentrated.

Complete cleaning by prior art processes must involve the following steps:

(A) Decoloration

Upon the evaporation of water for concentrating the NMMO in dilute aqueous NMMO solutions, because of the reaction of NMMO with cellulose decomposition products, strongly yellow to brown coloration occurs.

This coloration appears to be the result of the formation of pigmentatious compounds from polyvalent phenols from decomposition products to cellulose and from NMMO stabilizers which are customarily added to the solution. Due to increasing coloration of the NMMO solution, it is not possible to bleach the solution to such an extent as to obtain shaped cellulosic bodies with the desired degree of whiteness.

(B) Removal of transition metals

Transition metals, usually iron, are generally entrained into the process circulation by corrosion in the circulating piping, etc. and from the cellulose itself. The content of the transition metals must not exceed a certain critical maximum since the presence of the transition metals tends to lower the initial temperature for spinning mass deflagration.

When the stabilizer is gallic acid propylester, anionic metal complexes are formed which can be removed by anion exchangers.

If the stabilizer is, for example, rutin, an iron complex can form which cannot be removed by ion exchangers. As a consequence, the iron concentration tends to rise in the process circulation what increases the safety hazards. As a consequence, it is important to provide for the removal of iron and other transition metal ions from the process.

(C) Removal of nitrosoamines

In fresh NMMO, as a result of its fabrication, nitrosoamines may be present. The nitrosoamines can have a variety of toxic effects since it is highly detrimental to the liver, possesses gene toxicity in vitro as well as in germ cells, produces cancer in somatic cells, etc. Because of the general tumor-inducing effect of nitrosamines, complete removal thereof is essential for worker safety and health.

(D) Removal of cloudiness or turbidity

In addition to the discoloration of the spinning bath, precipitation can occur therein in the form of extremely finely-divided cellulosic materials and alkali and alkaline earth salts. These turbidities, which increase in the solution during repeated use in recycling, cannot be removed by filtration without filter aids. They affect detrimentally the product quality, give rise to problems when performing in-line color measurements and must, therefore, be removed.

In the conventional cleaning processes, moreover, it is important to avoid losses in NMMO.

Conventional cleaning processes involve a number of methods which have some basic drawbacks:

(a) Cleaning utilizing anion exchangers

This method is limited to decoloration by removal of ion complexes. Iron or other transition metals which are in ionic form, can be removed with an effectiveness which depends upon the stabilizer system. Significant removal of the fine cellulosic precipitate, i.e. the turbidity is not possible. Relatively large amounts of regenerating chemicals are required.

(b) Recrystallization from acetone

This method is highly time-consuming and energy expensive. Furthermore, the NMMO recovery rate is only a maximum of 85%.

OBJECTS OF THE INVENTION

It is the principal object of the present invention to provide an improved process for the cleaning or purification of aqueous NMMO solutions, especially so-called spinning bath solutions for the production of shaped cellulose articles like cellulosic filaments, whereby drawbacks of these earlier methods are avoided.

Another object of the invention is to provide an economical and environmentally safe process for cleaning an aqueous N-methylmorpholine-N-oxide solution which is capable, in a minimum number of steps, of decolorizing the solution by the removal of transition metals and other compounds therefrom and the removal of other pigmentatious materials, and also which is capable of eliminating turbidity from the solution.

Still another object of the invention is to provide a cleaning method which utilizes as the cleaning agent, low-cost materials capable of complete removal of nitrosoamines, fine cellulosic precipitates contributing to turbidity and practically quantitative removal of transition metals.

SUMMARY OF THE INVENTION

These objects and others which will become apparent hereinafter are attained, in accordance with the invention, by a process for cleaning an aqueous N-methylmorpholine-N-oxide solution, comprising the steps of:

(a) contacting an aqueous N-methylmorpholine-N-oxide solution with a particulate adsorbent capable of adsorbing transition metals from the solution; and (b) thereafter filtering the solution to remove the adsorbent therefrom.

According to the invention, therefore, the drawbacks of the earlier systems are eliminated by bringing the solution into contact with an adsorbent and then carrying out a filtration whereby the adsorbent and the contaminants from the solution adsorbed thereon, are removed from the solution. With the aid of the invention, we are able to obtain a minimum decoloration of at least 70%, a practically quantitative removal of nitrosamine, and the removal of the fine cellulosic precipitate, giving rise to a clean solution which is absolutely free from turbidities.

The adsorbent can be aluminum oxide (alumina), silicon dioxide (silica) or an adsorbing carbon such as coal, used individually or in combination.

A highly important advantage of the method of the invention is that it is practically completely free from any losses of amine oxide.

More particularly, the invention can be carried out in the following modes, it being noted that the best mode is deemed the use of alumina and precoat filter process, i.e. the formation of a filter mat by allowing the solution containing the adsorbent and a filter aid to deposit on a porous surface:

(i) $Al_2O_3$ of type C from the Firm Degussa is used as an adsorbent in a particle size less than 0.15 mm. The amount of the alumina added for a 20% spinning bath, i.e. an aqueous spinning bath containing 20% by weight NMMO, was about 1% by weight. The residence or contact time was several minutes. The solution was agitated with the adsorbent.

The adsorbent was then filtered off by simple filtration. After washing of the filter cake, the NMMO was fully recovered. The solution was free from turbidities as well.

(ii) Silica from the firm Degussa type "FK 700" was used in an amount 1% for 20% aqueous NMMO. The residence time was several minutes and the separation of the $SiO_2$ and turbidities was effected by filtration.

(iii) Powdered coal (brown coal or bituminous coal) or a coke thereof with an average particle size of 0.15 mm was used. In the case of coal, it was found that the surface area for this particle size was important and thus we used amounts of coal added to the spinning bath between 0.1% and 1% to obtain the desired degree of cleaning of the spinning bath. The residence time was several minutes average.

While normal filtration can be used to remove the charged coal, in this filtration the traces of cellulosic precipitate which ar removed and which deposit on the filter surface cause a very high pressure drop across the filter even after a very brief filter time. This pressure drop increases at a significant rate with increasing deposit of filtered material.

It has been found to be advantageous, therefore, to use a precoat filter process in which the filter mat is formed by deposit from the solution or to use cross flow microfiltration. Filtration in the presence of a filter aid, for example, cellulose, is also advantageous.

When filtration is effected with the use of cellulose as a filtration aid, even the finest particles of the adsorbent are removed very effectively. This is important since even the most meager traces of fine coal particles in the solution can drastically reduce the ability to bleach the cellulose products produced from the solution. As a consequence, the separation of the charged coal must be absolutely complete. Such removal is also a guarantee that the turbidities will be removed as completely as possible.

The fine cellulosic precipitate in the NMMO spinning bath and the very fine coal particles tend, even after a brief filtration period, to induce an enormous pressure drop in the filter and a filter layer must be used, therefore, which will remain permeable to the aqueous NMMO and nevertheless retain both of these finely divided materials.

This can be achieved when leaf cellulose is stirred into the water by an agitator to generate fibers and to act as a filter aid so that the filtered material can then be collected on a relatively coarse metal sieve by precoat filter techniques. When the cellulose layer is present in a thickness of about 1 cm on the metal sieve, practically all of the coal from the suspension can be removed and the solution will be free from residual turbidity or fine coal particles.

The after washing of the filter can be effected with completely demineralized water (CD water) so that the NMMO is recovered without loss from the filter layer.

Precoat filter process

A porous filter layer according to the invention is also formed, as distinct from the preformed filter layer described immediately above, when coal in the form of a thick coal/water suspension is directly floated onto, for example, an upright candle or cartridge filter. The suspension to be cleaned may be passed through this filter layer till the coal is exhausted. No turbidity caused by fine coal particles will thus be found in the filtrate. (Upon exhaustion of the coal amine oxide may be washed out.) By afterwashing with CD water, all amine oxide is removed from the coal layer.

An upright candle filter has the advantage that with a minimum of washing water, amine oxides can be recovered from the filter and indeed most of the amine oxide ca be recovered before the washing cycle. The formation of a mixing zone during washing of the coal is reduced. Before the coal is blown dry to increase its heating value, the wash water is readily drained from such a filter. By draining the liquid, a pressure differential between the exterior of the coal layer and the interior of the upright filter is maintained which ensures adhesion of the coal layer to the filter even upon replacement of the medium.

Crossflow microfiltration

In crossflow microfiltration (CMF) the coal-spinning bath suspension from a supply vessel is subjected to crossflow microfiltration. In this system there is a continuous separation of the cleaned or purified spinning bath as the permeate of the crossflow microfiltration (membrane filtration).

The coal suspension is greatly thickened and forms the retentate and can be dewatered in a chamber filter press. Using CD water, the coal can be washed free from NMMO in the chamber filter press. If desired, the coal can be still further dewatered by blowing air into the press to increase its heat value. The coal can then be burned if its destruction is advantageous, or can be regenerated for reuse.

For regeneration, we have found the following regeneration chemicals to be suitable: sodium hydroxide solution, sodium hydroxide/ethanol, ammonia/methanol, ammonia/2-propanol and/or ammonia/acetone. The ammonia can be in the form of ammonia solution, i.e. aqueous $NH_4OH$.

The coal to be regenerated after complete elution of the NMMO is suspended in the regeneration solution and then is separated by filtration from the filtrate. After neutral washing, the coal can be reused for cleaning the aqueous NMMO solution.

For testing the cleaning effect of the process variations, the following analysis techniques are used:

Decoloration: By measurement of the extension at 470 nm with a Perkin-Elmer photometer.

Iron content: By means of atomic absorption and x-ray fluorescence measurements.

Turbidity (predominantly from fine cellulosic precipitate): with a TRM-L turbidometer manufactured by the firm Drott.

Nitrosoamines: By gas chromatographic separation utilizing a TEA detector manufactured by the firm Thermo Electron the standardization is effected with N-Nitrosomorpholine and dimethylnitrosamine.

SPECIFIC EXAMPLES

EXAMPLE 1

Use of aluminium oxide as the adsorbent.

50 ml of an NMMO spinning bath is agitated with 0.5 g aluminium oxide (amounting to 0.1% of the spinning bath) in a beaker and then permitted to stand for 30 minutes. The mixture is filtered on a filter, having a filtration time of 1500 s according to Herzberg (Blue Ribbon, ashless by Schleicher & Shuell), and the filtrate is analyzed. The decoloration was 98%, the iron removal amounted to 94% and the reduction in turbidity was 98%.

EXAMPLE 2

Use of silicon oxide as adsorbent.

50 ml of a spinning bath is mixed with 0.5 g silicon dioxide and after ½ hour filtered on a blue ribbon filter. The filtrate was completely clear, decolored to 72% and had its iron content reduced by 70%.

EXAMPLES 3 to 8

Use of brown coal as adsorbent.

EXAMPLE 3

2 g of brown coal coke dust is suspended for 2 minutes in 100 ml of the NMMO-containing spinning bath. The suspension was filtered on a fritted glass No. 3 filter of an area of 15 cm² upon which a blue ribbon filter was placed and the extinction of the filtrate measured at 470 nm.

| Extinction: |  |
| --- | --- |
| Starting spinning bath | = 0.608 |
| Clean spinning bath | = 0.095 |
| Decoloring effect: | 85% |
| Turbidity, |  |
| Starting spinning bath | = 16.3 FTU. |
| Clean spinning bath | = 0.2 FTU. |

(FTU = Formazin trubidity units; Formazin is a standardizing substance.)
Reduction in turbidity = 98.8%

EXAMPLE 4

100 ml of a spinning bath (extinction 0.413) was filtered on 2.5 g of coke dust and the extinction of the filtrate determined. The following table shows the relationship between the coal added to the spinning bath and its decoloration effect.

| Ratio Coal/Spinning Bath | Extinction 470 nm | Decoloration % |
| --- | --- | --- |
| 1:40 | 0.042 | 90 |
| 1:80 | 0.092 | 78 |
| 1:120 | 0.138 | 67 |
| 1:160 | 0.175 | 57 |
| 1:200 | 0.208 | 49 |
| 1:240 | 0.255 | 38 |
| 1:280 | 0.283 | 31 |
| 1:320 | 0.318 | 22 |

The reduction in turbidity in all cases exceeded 95% although the filtration time rose in the test series by about 10 times.

EXAMPLE 5

200 ml of a spinning bath (20.6% NMMO) was filtered over 27.37 g (=50 ml) of dry coke dust. The products were 48.52 g moist coke dust corresponding to an NMMO quantity of 4.45 g. The moist coal was washed 4 times with 50 ml each of CD water and the NMMO content of the individual washing water fractions was determined.

|  | NMMO (%) | NMMO (g) |
| --- | --- | --- |
| 1. Wash water fraction | 6.8 | 3.40 |
| 2. Wash water fraction | 1.6 | 0.80 |
| 3. Wash water fraction | 0.4 | 0.20 |
| 4. Wash water fraction | 0.1 | 0.05 |
| Sum |  | 4.45 |

EXAMPLE 6

A 20% aqueous NMMO solution is combined with $FeCl_3.6H_2O$ and the iron removal measured with various amounts of coal as the added adsorbent. The extinction at 470 nm for the aqueous solution at starting was 0.682, the iron content was 33.5 ppm and the turbidity was 20.3 FTU. The results are shown in the following table.

| Amount of coal added % | Extinction 470 nm | Decoloration % | Fe ppm | Iron Removal % | Clarification* % |
| --- | --- | --- | --- | --- | --- |
| 0.2 | 0.081 | 88 | 3.1 | 90.7 | 96.3 |
| 0.5 | 0.031 | 95 | 1.5 | 95.5 | 97.1 |
| 1.0 | 0.020 | 97 | 1.2 | 96.4 | 97.8 |
| 2.0 | 0.009 | 98 | 1.1 | 96.7 | 98.0 |

*Reduction of turbidity

EXAMPLE 7

5 kg of coke dust is dispersed in 200 ml of a spinning bath which has been used once and contains 20.7% NMMO, over a period of 5 minutes; to separate the coal, a 5μ GAF-filter (5 l) was employed. The first filtrate was black by reason of the presence of fine particles of coal. With increasing filtration time, the filtrate became increasingly clear until it was water clear.

Average decoloration: 93%.

Average reduction in turbidity: 97.5%

EXAMPLE 8

200 g of coal is suspended in 1800 ml of CD water and filtered by the precoat filter process described on an upright candle filter with a filter surface of 0.012 m² as made by the firm Dr. M.,mark Fundapack. In all 44 l of the spinning bath were cleaned at a specific flow of 1250 l/m².h declining in the period of flow to 910 l/m².h The decoloration effect was 96.4%, the turbidity reduction was 99% and the iron reduction was 96%. For washing out the NMMO, 3 l of CD water was used, the NMMO being completely scrubbed from the coal. By blowing 7 l of air through the coal, a dry content thereof of 62% was obtained.

EXAMPLE 9

Use of active coal as adsorbent.

200 l of a spinning bath (20% NMMO) was preheated to 50° C. in a supply vessel of a cross flow microfiltration apparatus. Then it was mixed with 0.5% of type "BL" active coal manufactured by the firm Chemviron. To separate the coal and cellulose-fine particles (starting quantity: 12 FTU) a Teflon membrane as made by the Purolator firm was used.

Flow across the membrane: 2 m/s.
Pressure difference: 0.2 bar.
Permeate flow: 1660 l/m²/h decreasing to 1000 l/m²/h.
Turbidity of the permeate: 0.2 FTU.

There was no concentration of NMMO (the NMMO concentrations of the starting solution was the same as that of the permeate and of the retentate). The coal suspension was concentrated to 9 l, corresponding to a concentration of 1:22. The thickened coal suspension was dewatered in a chamber filter press in which the pressure was raised to 10 bar and the coal coke was washed free from NMMO with CD water.

The dry content of the coal was brought to 59.6% by blowing air into the system. The table shows the effect of filtration (left 2 columns) and the washing (right 3 columns).

| Filtration | | Washing | | |
|---|---|---|---|---|
| Pressure bar | Volume l | Pressure bar | Volume l | NMMO Concentration % |
| 0.1 | 0 | 5.7 | 0 | 14.48 |
| 0.2 | 2 | 7.9 | 3 | 7.38 |
| 0.4 | 3 | 7.5 | 6 | 1.37 |
| 0.5 | 4 | 7.4 | 9 | 0.70 |
| 0.7 | 5 | 6.5 | 12 | 0.48 |
| 1.0 | 6 | 7.4 | 15 | 0.00 |
| 1.4 | 7 | | | |
| 3.0 | 8 | | | |
| 10.0 | 9 | | | |

EXAMPLE 10

Regeneration of the active coal obtained in Example 9.

The regeneration of the active coal of Example 9 was effected with sodium hydroxide in combination with an organic solvent, preferably acetone. The capacity loss after regeneration was held below 2%. A spinning bath used once and with an NMMO concentration of 19.8% was mixed with active coal from the Chemviron firm. For each adsorption, the active coal was agitated with intense mixing in the spin bath. The filtration of the coal from the filtrate was effected on a membrane filter of the PA or Versapor type. The filter cake was washed neutral with CD water and in small portions treated with the regeneration solution. After neutral wash, the coal was shaved from the membrane and reused. Comparison of the coal capacity after regeneration with the original coal capacity, utilizing different regeneration solutions and with use of the coal in an amount of 0.5% with respect to NMMO, gave the results of the following table.

| Regeneration Solution Regeneration No. | Capacity of the Coal (%) | | | |
|---|---|---|---|---|
| | NaOH/H$_2$O | NH$_4$OH/MeOH | NH$_4$OH/PrOH | NH$_4$OH/Acetone |
| 1 | 94.4% | 97.4% | 97.1% | 95.8% |
| 2 | 89.2% | 91.7% | 93.4% | 93.5% |
| 3 | 84.2% | 95.0% | 92.1% | 89.5% |
| 4 | 80.8% | 88.9% | 89.5% | 91.2% |
| 5 | 75.9% | | 88.5% | 90.3% |
| 6 | | | 87.7% | 90.2% |
| 7 | | | 85.5% | 90.7% |
| 8 | | | 82.2% | 87.8% |
| 9 | | | 80.7% | 83.9% |
| 10 | | | 82.9% | 84.9% |
| 11 | | | | 86.6% |
| 12 | | | | 86.6% |
| 13 | | | | 87.7% |
| 14 | | | | 79.2% |
| 15 | | | | 80.8% |
| 16 | | | | 81.0% |
| 17 | | | | 79.7% |
| 18 | | | | 75.6% |
| 19 | | | | 78.5% |

We claim:

1. A process for cleaning an aqueous N-methylmorpholine-N-oxide solution containing transition metal impurities, comprising the steps of:
   (a) contacting the aqueous N-methylmorpholine-N-oxide solution containing transition metal impurities with a particulate adsorbent selected from the group consisting of aluminum oxide, silicon dioxide, and an adsorbing carbon, capable of adsorbing transition metals from said solution; and
   (b) thereafter filtering said solution to remove said adsorbent therefrom.

2. The process defined in claim 1 wherein said adsorbent is aluminum oxide.

3. The process defined in claim 1 wherein said adsorbent is silicon dioxide.

4. The process defined in claim 1 wherein said adsorbent is an adsorbing carbon.

5. The process defined in claim 4 wherein said adsorbing carbon is coal.

6. The process defined in claim 1 wherein said adsorbent has a particle size of <0.15 mm.

7. The process defined in claim 1 wherein the filtering in step (b) is effected in the presence of a filter aid.

8. The process defined in claim 7 wherein the filter aid is a cellulose.

9. The process defined in claim 8 wherein the filtering in step (b) is effected by cross-flow microfiltration.

10. The process defined in claim 8 wherein the filtering in step (b) is effected by a precoat filter process, where coal in the form of a thick coal/water suspension, is directly floated onto an upright candle filter or a cartridge filter, and the N-methylmorpholine-N-oxide solution to be cleaned is passed through the upright candle filter or the cartridge filter until the coal is exhausted.

11. The process defined in claim 1 wherein the filtering in step (b) is effected by cross-flow microfiltration.

12. The process defined in claim 1 wherein the filtering in step (b) is effected by a precoat filter process, where coal in the form of a thick coal/water suspension, is directly floated onto an upright candle filter or a cartridge filter, and the N-methylmorpholine-N-oxide solution to be cleaned is passed through the upright candle filter or the cartridge filter until the coal is exhausted.

* * * * *